United States Patent [19]
Sekiyama et al.

[11] Patent Number: 6,150,450
[45] Date of Patent: *Nov. 21, 2000

[54] PLASTIC COMPOSITIONS AND PLASTIC CARDS MADE THEREOF

[75] Inventors: Masayoshi Sekiyama; Tetsuya Yamaoka; Nobuyasu Suzuki, all of Hiratsuka, Japan

[73] Assignee: Mitsubishi Plastics, Inc., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/556,396

[22] Filed: Nov. 9, 1995

[30] Foreign Application Priority Data

Nov. 14, 1994 [JP] Japan ................................ 6-279425
Nov. 16, 1994 [JP] Japan ................................ 6-281934
Jul. 19, 1995 [JP] Japan ................................ 7-182754

[51] Int. Cl.$^7$ .......................... C08L 55/02; B42D 15/10
[52] U.S. Cl. ......................... 524/441; 524/447; 524/451; 525/230
[58] Field of Search ..................... 525/230; 524/441, 524/447, 451

[56] References Cited

U.S. PATENT DOCUMENTS

| | | | |
|---|---|---|---|
| 4,102,945 | 7/1978 | Gleave | 525/293 |
| 5,384,345 | 1/1995 | Naton | 523/218 |
| 5,556,916 | 9/1996 | Matoba et al. | 525/64 |

FOREIGN PATENT DOCUMENTS

| | | |
|---|---|---|
| 1 950 622 | 5/1970 | Germany . |
| 32 32 032 | 3/1983 | Germany . |
| 42 14 846 | 11/1993 | Germany . |
| 1 526 627 | 9/1978 | United Kingdom . |

*Primary Examiner*—Jeffrey C. Mullis
*Attorney, Agent, or Firm*—Oblon, Spivak, McClelland, Maier & Neustadt, P.C.

[57] ABSTRACT

A plastic composition comprising an acrylonitrile component, a butadiene component and a styrene component, wherein the content of the butadiene component is from 5 to 15 mol %, the content of the acrylonitrile component is from 40 to 50 mol % and the content of the styrene component is from 40 to 50 mol %, said composition having a melt flow index of at least 5 g/10 min (as measured at 260° C. with a force of 2.16 kg in accordance with JIS K7210).

7 Claims, No Drawings

PLASTIC COMPOSITIONS AND PLASTIC CARDS MADE THEREOF

The present invention relates to plastic compositions useful for forming plastic cards such as credit cards or IC cards, which are used as embossed, and plastic cards made of such compositions.

Plastics cards having symbols, letters, etc. embossed by embossing, like credit cards, are widely used. Heretofore, a plastic sheet formed by using a polyvinyl chloride resin has been employed as the material for such plastic cards, since good calendering properties are required for embossing. However, a plastic sheet formed by using a polyvinyl chloride resin has had a problem that depending upon the type and the number of letters, the embossed letters are likely to have cracks.

In order to improve the impact resistance or flexibility of a polyvinyl chloride resin sheet, it is known to add a methyl methacrylate/butadiene/styrene resin or an ethylene/vinyl acetate copolymer resin to the polyvinyl chloride resin, or to use a sheet formed by using a polyvinyl chloride resin as a core material and laminating a polyvinyl chloride resin overlay film thereon to improve the embossing processability. By such a method, cracking of embossed letters at the time of embossing may be prevented, but the polyvinyl chloride sheet has a low thermal deformation temperature and inadequate heat resistance and thus has a problem that at a high temperature, a deformation due to heat will be substantial, and the embossed portions tend to return to the initial flat state.

As a method for improving the heat resistance of a polyvinyl chloride resin sheet, Japanese Unexamined Patent Publication No. 68681/1973 discloses a method wherein a polyvinyl chloride resin overlay film is laminated on each side of a core material made essentially of an acrylonitrile/styrene copolymer or an acrylonitrile/butadiene/styrene copolymer. However, in this case, a step of laminating the overlay film on the core material will be required, which adds to the production costs. Further, in a case where an IC card is to be prepared, a step of grinding to form a recess to accommodate IC is required, which further adds to the production costs.

Here, it is conceivable that a plastic card may be formed by monolithic molding by an injection molding method using an acrylonitrile/butadiene/styrene copolymer plastic composition having a high thermal deformation temperature (heat resistance) in order to improve the heat resistance. In this case, the lamination step can be eliminated, but it is required to conduct molding at a high speed by using an acrylonitrile/butadiene/styrene copolymer resin having good fluidity to form a thin card, whereby molecules constituting the resin will be stretched by the high speed flow, and an orientation of molecules aligned in a certain direction (flow orientation) will be remarkable. Therefore, the molded plastic card will have an anisotropy in the mechanical properties, and there has been a problem that embossed letters tend to crack or warp at the time of the embossing operation.

The present invention has been accomplished as a result of extensive researches to solve the above-mentioned conventional problems.

In a first aspect, the present invention provides a plastic composition comprising an acrylonitrile component, a butadiene component and a styrene component, wherein the content of the butadiene component is from 5 to 15 mol %, the content of the acrylonitrile component is from 40 to 50 mol % and the content of the styrene component is from 40 to 50 mol %, said composition having a melt flow index of at least 5 g/10 min (as measured at 260° C. with a force of 2.16 kg in accordance with JIS K7210).

In a second aspect, the present invention provides a plastic composition comprising an acrylonitrile component, an acrylic rubber component and a styrene component, wherein the content of the acrylic rubber component is from 3 to 15 mol %, the content of the acrylonitrile component is from 40 to 55 mol %, and the content of the styrene component is from 40 to 50 mol %, said composition having a melt flow index of at least 5 g/10 min (as measured at 260° C. with a force of 2.16 kg in accordance with JIS K7210).

In a third aspect, the present invention provides such a plastic composition wherein a methyl methacrylate/butadiene/styrene resin is added in an amount of from 0.5 to 25 parts by weight per 100 parts by weight of the composition.

In a fourth aspect, the present invention provides such a plastic composition wherein talc is added in an amount of from 0.5 to 25 parts by weight per 100 parts by weight of the composition.

In a fifth aspect, the present invention provides such a plastic composition wherein the talc has an average particle size of from 4 to 30 $\mu$m (as measured by a light transmitting centrifugal sedimentation method by means of SA-CP3, manufactured by Shimadzu Corporation).

In a sixth aspect, the present invention provides such a plastic composition wherein kaolin is added in an amount of from 5 to 25 parts by weight per 100 parts by weight of the composition.

In a seventh aspect, the present invention provides such a plastic composition wherein the kaolin has an average particle size of from 0.5 to 10 $\mu$m.

In an eighth aspect, the present invention provides such a plastic composition wherein aluminum-type plate-like fine crystals are added in an amount of from 5 to 25 parts by weight per 100 parts by weight of the composition.

In a ninth aspect, the present invention provides a plastic card molded by injection molding such a plastic composition.

Now, the present invention will be described in detail with reference to the preferred embodiments.

In the first aspect of the present invention, the plastic composition comprises an acrylonitrile component, a butadiene component and a styrene component, in order to improve the heat resistance. Among the constituting components of such a plastic composition, the effect of the butadiene component for improving the impact resistance is substantially influential over the state of cracking of embossed letters at the time of embossing operation of a molded plastic card. Paying an attention to this fact, the content of the butadiene component has been set to be from 5 to 15 mol %, the content of the acrylonitrile component has been set to be from 40 to 50 mol %, and the content of the styrene component has been set to be from 40 to 50 mol %.

If the content of the butadiene component is less than 5 mol %, the effect for improving the impact resistance and elongation properties tends to be inadequate, whereby cracking of embossed letters is likely to take place during the embossing operation of a plastic card obtained by injection molding. On the other hand, if the content of the butadiene component exceeds 15 mol %, it tends to be difficult to adequately polymerize the composition of the invention. Therefore, the upper limit of the content of the butadiene component is 15 mol %.

The moldability (fluidity) at the time of injection molding is influenced substantially by the melt flow index (as measured at 260° C. with a force of 2.16 kg in accordance with JIS K7210) (hereinafter referred to simply as MI). If MI is less than 5 g/10 min, the moldability tends to be inadequate, and a molding defect will result. Therefore, MI is at least 5 g/10 min. The larger the value of MI, the better the moldability. However, in order to increase MI, it is necessary to lower the degree of polymerization of the acrylonitrile component, the butadiene component and the styrene component. Depending upon the polymerization conditions, if the degree of polymerization is too low, the composition of the present invention will not adequately be polymerized. Therefore, the upper limit of MI is about 25 g/10 min.

In the second aspect of the present invention, the plastic composition comprises an acrylonitrile component, an acrylic rubber component and a styrene component, in order to improve the heat resistance. Among the constituting components of such a plastic composition, the effect of the acrylic rubber component for improving the impact resistance is influential substantially over the state of cracking of embossed letters at the time of the embossing operation of a molded plastic card. Paying an attention to this fact, the content of the acrylic rubber component has been set to be from 3 to 15 mol %, the content of the acrylonitrile component has been set to be from 40 to 55 mol %, and the content of the styrene component has been set to be from 40 to 50 mol %.

If the content of the acrylic rubber component is less than 3 mol %, the effect for improving the impact resistance and elongation properties tends to be inadequate, whereby cracking of embossed letters will take place at the time of the embossing operation of the plastic card obtained by injection molding. On the other hand, if the content of the acrylic rubber component exceeds 15 mol %, it tends to be difficult to adequately polymerize the composition of the present invention. Therefore, the upper limit of the content of the acrylic rubber component is 15 mol %.

The moldability (fluidity) at the time of injection molding is substantially influenced by MI. If MI is less 5 g/10 min, the moldability will be inadequate, and a molding defect will result. Therefore, MI is at least 5 g/10 min. The larger the value of MI, the better the moldability. However, to increase MI, it is necessary to lower the degree of polymerization of the acrylonitrile component, the acrylic rubber component and the styrene component. Depending upon the polymerization conditions, if the degree of polymerization is too low, the composition of the present invention can not adequately be polymerized. Therefore, the upper limit of MI is about 25 g/10 min.

Even with a plastic card formed by injection molding of the plastic composition according to the first or second aspect of the present invention, cracking of embossed letters may happen if the type of the embossing machine (manual or electric, machine model), the speed of embossing, the type of letters, the temperature for the embossing operation, or the like, differs. Accordingly, in the third aspect of the present invention, a methyl methacrylate/butadiene/styrene resin as an impact resistance improving agent is added in an amount of from 0.5 to 25 parts by weight per 100 parts by weight of the plastic composition according to the first or second aspect of the present invention, whereby prevention of cracking of embossed letters can further be improved. If the amount of the methyl methacrylate/butadiene/styrene resin is less than 0.5 part by weight, no adequate effect for improving the impact resistance can be obtained. Therefore, the amount is at least 0.5 part by weight. On the other hand, if the amount of the methyl methacrylate/butadiene/styrene resin exceeds 25 parts by weight, the moldability tends to be inadequate, and a molding defect will result. Therefore, the amount is at most 25 parts by weight.

In the fourth aspect of the present invention, talc is added in an amount of from 0.5 to 25 parts by weight per 100 parts by weight of the plastic composition according to the first, second or third aspect of the present invention, whereby warpage (curling) of the plastic card during the embossing operation can be minimized. The larger the amount of the talc component, the better the improvement in minimizing the warpage. However, if the talc component exceeds 25 parts by weight, a molding defect such as silver streak is likely to form during the molding. Therefore, the upper limit of the talc component is 25 parts by weight.

If a methyl methacrylate/butadiene/styrene resin as an impact resistance improving agent is added in an amount of from 1 to 20 parts by weight per 100 parts by weight of the composition according to the above fourth aspect of the present invention, it is possible to further improve the prevention of cracking of embossed letters. If the amount of the methyl methacrylate/butadiene/styrene resin is less than 1 part by weight, no adequate effect for improving the impact resistance can be obtained. Therefore, the amount is at least 1 part by weight. On the other hand, if the methyl methacrylate/butadiene/styrene resin is added in an amount exceeding 20 parts by weight, the moldability tends to be inadequate, and a molding defect is likely to result. Therefore, the amount is at most 20 parts by weight.

In the fifth aspect of the present invention, the average particle size (as measured by a light transmitting centrifugal sedimentation method by means of SA-CP3, manufactured by Shimadzu Corporation) of the talc component according to the fourth aspect of the present invention is from 4 to 30 $\mu$m. The larger the particle size of the talc component, the better the improvement in minimizing the warpage. However, if the particle size of the talc component is large, dispersion tends to be poor depending upon the relation with the amounts of various additives, or the surface condition tends to be adversely affected. On the other hand, if the particle size is small, it may happen that no adequate effect for minimizing the warpage tends to be obtained depending upon the relation with the amounts of various additives. Therefore, the average particle size is more preferably from 6 to 22 $\mu$m.

In the sixth aspect of the present invention, kaolin (Kaolin Clay, tradename, manufactured by Shiraishi Calcium K.K. or Kaobrite, tradename, manufactured by Shiraishi Kogyo K.K.) is added in an amount of from 5 to 25 parts by weight per 100 parts by weight of the plastic composition according to the first, second or third aspect of the present invention, whereby the warpage (curling) of the plastic card during the embossing operation can be minimized. The larger the amount of the kaolin component, the better the improvement in minimizing the warpage. However, if the kaolin component exceeds 25 parts by weight, a molding defect such as silver streak is likely to form during the molding. Therefore, the upper limit of the kaolin component is 25 parts by weight.

If a methyl methacrylate/butadiene/styrene resin as an impact resistance improving agent is added in an amount of from 1 to 20 parts by weight per 100 parts by weight of the composition according to the sixth aspect of the present invention, it is possible to further improve the prevention of cracking of embossed letters. If the methyl methacrylate/butadiene/styrene resin is less than 1 part by weight, no adequate effect for improving the impact resistance can be obtained. Therefore, the amount is at least 1 part by weight. On the other hand, if the methyl methacrylate/butadiene/ styrene resin is added in an amount exceeding 20 parts by weight, the moldability tends to be inadequate, and a molding defect will result. Therefore, the amount is at most 20 parts by weight.

In the seventh aspect of the present invention, the average particle size (as measured by a light transmitting centrifugal sedimentation method by means of SA-CP3, manufactured by Shimadzu Corporation) of the kaolin component according to the sixth aspect of the present invention is from 0.5 to 10 μm. The larger the particle size of the kaolin component, the better the improvement in minimizing the warpage. However, if the particle size of the kaolin component is large, dispersion tends to be poor depending upon the relation with the amounts of various additives, and the surface condition tends to be adversely affected. On the other hand, if the particle size is small, no adequate effect for minimizing the warpage tends to be obtained depending upon the relation with the amounts of various additives. Therefore, the average particle size is more preferably from 2 to 8 μm.

According to the eighth aspect of the present invention, aluminum type plate-like fine crystals (Mizukalac, tradename, manufactured by Mizusawa Kagaku Kogyo K.K.) are added in an amount of from 5 to 25 parts by weight, per 100 parts by weight of the plastic composition according to the first, second or third aspect of the present invention, whereby it is possible to minimize the warpage (curling) of a plastic card during the embossing operation. The larger the amount of the aluminum type plate-like fine crystal component, the better the improvement in minimizing the warpage. However, if the aluminum type plate-like fine crystal component exceeds 25 parts by weight, a molding defect such as silver streak is likely to result during the molding. Therefore, the upper limit of the aluminum type plate-like fine crystal component is 25 parts by weight.

If a methyl methacrylate/butadiene/styrene resin as an impact improving agent is added in an amount of from 1 to 20 parts by weight per 100 parts by weight of the composition according to the eighth aspect of the present invention, it is possible to further improve the prevention of cracking of embossed letters. If the methyl methacrylate/butadiene/styrene resin is less than 1 part by weight, no adequate effect for improving the impact resistance can be obtained. Therefore, the amount is at least 1 part by weight. On the other hand, if the methyl methacrylate/butadiene/styrene resin is added in an amount exceeding 20 parts by weight, the moldability tends to be inadequate, and a molding defect is likely to result. Therefore, the amount is at most 20 parts by weight.

In the ninth aspect of the present invention, the composition according to any one of the first to eighth aspects of the present invention is molded by an injection molding method to obtain a plastic card.

Now, the present invention will be described in further detail with reference to Examples and Comparative Examples. However, it should be understood that the present invention is by no means restricted to such specific Examples.

EXAMPLE 1

| | |
|---|---|
| Content of the butadiene component | 5 mol % |
| Content of the acrylonitrile component | 47 mol % |

-continued

| | |
|---|---|
| Content of the styrene component | 48 mol % |
| MI | 10 g/10 min |

EXAMPLE 2

| | |
|---|---|
| Content of the butadiene component | 6 mol % |
| Content of the acrylonitrile component | 47 mol % |
| Content of the styrene component | 47 mol % |
| MI | 5 g/10 min |

EXAMPLE 3

| | |
|---|---|
| Content of the butadiene component | 9 mol % |
| Content of the acrylonitrile component | 45 mol % |
| Content of the styrene component | 46 mol % |
| MI | 12 g/10 min |

EXAMPLE 4

| | |
|---|---|
| Content of the butadiene component | 15 mol % |
| Content of the acrylonitrile component | 42 mol % |
| Content of the styrene component | 43 mol % |
| MI | 7 g/10 min |

COMPARATIVE EXAMPLE 1

| | |
|---|---|
| Content of the butadiene component | 4 mol % |
| Content of the acrylonitrile component | 48 mol % |
| Content of the styrene component | 48 mol % |
| MI | 25 g/10 min |

COMPARATIVE EXAMPLE 2

| | |
|---|---|
| Content of the butadiene component | 13 mol % |
| Content of the acrylonitrile component | 43 mol % |
| Content of the styrene component | 44 mol % |
| MI | 3 g/10 min |

Each of the above compositions was heated and kneaded by an injection molding machine and molded by an injection molding method into a card for IC card having a thickness of about 0.8 mm, and embossing was applied to the card for IC card.

Cards for IC cards molded from the respective compositions of the above Examples and Comparative Examples, were evaluated in accordance with the following evaluation methods, and the results are shown in Table 1.

(1) The state of cracking of embossed letters at the time of the embossing operation The card was evaluated in comparison with a card for IC card injection molded from a polyvinyl chloride resin (hereinafter referred to as a conventional product).

⊚: superior, ○: equivalent, ×: inferior
(2) Moldability
    ⊚: excellent, ○: good, ×: poor
(3) Emboss reduction After the embossing operation, the embossed card was heated to 90° C. for 30 minutes, whereupon percent reduction in the height of the embossed portions due to the deformation was evaluated in comparison with the conventional product (a card for IC card injection molded from a polyvinyl chloride resin).

TABLE 1

|  | Cracking of embossed letters | Moldability | Emboss reduction (%) |
| --- | --- | --- | --- |
| Example 1 | ○ | ○ | 23 |
| Example 2 | ○ | ○ | 25 |
| Example 3 | ○ | ⊚ | 27 |
| Example 4 | ⊚ | ○ | 28 |
| Comparative Example 1 | × | ⊚ | 22 |
| Comparative Example 2 | ⊚ | × | 28 |
| Conventional product | — | — | 92 |

It is evident from Table 1 that cards for IC cards injection molded from the compositions of Examples 1 to 4, wherein the content of the butadiene component was from 5 to 15 mol %, the content of the acrylonitrile component was from 40 to 50 mol %, the content of the styrene component was from 40 to 50 mol %, and MI was at least 5 g/10 min, are equal or superior to the conventional product (a card for IC card injection molded from a polyvinyl chloride resin) in the prevention of cracking of embossed letters at the time of the embossing operation, and they are also good or excellent in the moldability.

In Comparative Example 1, the content of the butadiene component was 4 mol %, and MI was 25 g/10 min. As MI was at least 5 g/10 min, the moldability was excellent, but as the content of the butadiene component was less than 5 mol %, cracking of embossed letters was observed during the embossing operation, and thus the product was inferior to the conventional product (a card for IC card injection molded from a polyvinyl chloride resin).

In Comparative Example 2, the content of the butadiene component was 13 mol %, and MI was 3 g/10 min. As the content of the butadiene component was within a range of from 5 to 15 mol %, the product was superior to the conventional product (a card for IC card injection molded from a polyvinyl chloride resin) in the prevention of cracking of embossed letters at the time of the embossing operation, but as MI was less than 5 g/10 min, the moldability was poor.

The foregoing evaluation of the embossing operation was carried out by means of a manual embossing machine. When evaluation was carried out by an electric embossing machine, cracking of embossed letters was found to occur sometimes. Therefore, the following compositions were prepared by adding a methyl methacrylate/butadiene/styrene resin to the composition of the above Example 1 wherein:

| Content of the butadiene component | 5 mol % |
| --- | --- |
| Content of the acrylonitrile component | 47 mol % |

-continued

| Content of the styrene component | 48 mol % |
| --- | --- |
| MI | 10 g/10 min |

EXAMPLE 5

The methyl methacrylate/butadiene/styrene resin was added in an amount of 0.5 part by weight to 100 parts by weight of the composition of Example 1.

EXAMPLE 6

The methyl methacrylate/butadiene/styrene resin was added in an amount of 5 parts by weight to 100 parts by weight of the composition of Example 1.

EXAMPLE 7

The methyl methacrylate/butadiene/styrene resin was added in an amount of 15 parts by weight to 100 parts by weight of the composition of Example 1.

EXAMPLE 8

The methyl methacrylate/butadiene/styrene resin was added in an amount of 25 parts by weight to 100 parts by weight of the composition of Example 1.

COMPARATIVE EXAMPLE 3

The methyl methacrylate/butadiene/styrene resin was added in an amount of 27 parts by weight to 100 parts by weight of the composition of Example 1.

Each of the above compositions were heated and kneaded by an injection molding machine and molded by an injection molding method into a card for IC card having a thickness of about 0.8 mm, and embossing was applied to the card for IC card. Using an electric embossing machine, evaluation was carried out in the same manner as described above, and the results are shown in Table 2.

TABLE 2

|  | Cracking of embossed letters | Moldability | Emboss reduction (%) |
| --- | --- | --- | --- |
| Example 5 | ○ | ○ | 27 |
| Example 6 | ○ | ○ | 28 |
| Example 7 | ⊚ | ○ | 30 |
| Example 8 | ⊚ | ○ | 32 |
| Comparative Example 3 | ⊚ | × | 33 |

It is evident from Table 2 that cards for IC cards injection molded from the compositions of Examples 5 to 8 wherein the methyl methacrylate/butadiene/styrene resin was added in an amount of from 0.5 to 25 parts by weight, are improved in the prevention of cracking of embossed letters. In Comparative Example 3, the methyl methacrylate/butadiene/styrene resin was added in an amount of 27 parts by weight, whereby the prevention of cracking of embossed letters was improved, but the moldability was poor.

Further, a method for reducing the warpage (curling) of the plastic card during the embossing operation, was studied, and as a result talc was found to reduce the warpage (curling). On the basis of this discovery, the following compositions were prepared by adding talc to the composition of the above Example 1 wherein:

| Content of the butadiene component | 5 mol % |
|---|---|
| Content of the acrylonitrile component | 47 mol % |
| Content of the styrene component | 48 mol % |
| MI | 10 g/10 min |

EXAMPLE 9

Talc was added in an amount of 0.5 part by weight to 100 parts by weight of the composition of Example 1.

EXAMPLE 10

Talc was added in an amount of 5 parts by weight to 100 parts by weight of the composition of Example 1.

EXAMPLE 11

Talc was added in an amount of 10 parts by weight to 100 parts by weight of the composition of Example 1.

EXAMPLE 12

Talc was added in an amount of 20 parts by weight to 100 parts by weight of the composition of Example 1.

EXAMPLE 13

Talc was added in an amount of 25 parts by weight to 100 parts by weight of the composition of Example 1.

COMPARATIVE EXAMPLE 4

Talc was added in an amount of 27 parts by weight to 100 parts by weight of the composition of Example 1.

Each of the above compositions was heated and kneaded by an injection molding machine and molded by an injection molding method into a card for IC card having a thickness of about 0.8 mm, and embossing was applied to the card for IC card by means of an embossing machine. Then, the card was colored by a chipper (coloring machine). The warpage of the card was measured in accordance with JIS X6301, and the results are shown in Table 3. In Table 3, warpage A represents the amount of warpage (mm) after the embossing operation by means of a manual embossing machine, and warpage B represents the amount of warpage (mm) after the embossing operation by means of a manual embossing machine, followed by coloring by the chipper. Warpage C represents the amount of warpage (mm) after the embossing operation by means of an electric embossing machine, and warpage D represents the amount of warpage (mm) after the embossing operation by means of an electric embossing machine, followed by coloring by the chipper.

TABLE 3

|  | Warpage A (mm) | Warpage B (mm) | Warpage C (mm) | Warpage D (mm) | Moldability | Cracking of embossed letters |
|---|---|---|---|---|---|---|
| Example 1 | 2.6 | 2.3 | 2.7 | 2.4 | ○ | ○ |
| Example 9 | 2.3 | 1.9 | 2.4 | 2.1 | ○ | ○–x |
| Example 10 | 2.2 | 1.8 | 2.3 | 2.0 | ○ | ○–x |
| Example 11 | 1.7 | 1.5 | 2.2 | 1.9 | ○ | ○–x |
| Example 12 | 1.5 | 1.3 | 2.0 | 1.7 | ○ | ○–x |
| Example 13 | 1.1 | 0.9 | 1.9 | 1.6 | ○ | ○–x |

TABLE 3-continued

|  | Warpage A (mm) | Warpage B (mm) | Warpage C (mm) | Warpage D (mm) | Moldability | Cracking of embossed letters |
|---|---|---|---|---|---|---|
| Comparative Example 4 | 1.0 | 0.8 | 1.8 | 1.5 | x | x |

It is evident from Table 3 that when the talc component is added in an amount of from 0.5 to 25 parts by weight, the warpage after the embossing operation or after coloring by the chipper satisfies the requirement of the amount of warpage being within 2 mm as stipulated in JIS X6301, and the moldability is also satisfactory. In Comparative Example 4, talc was added in an amount of 27 parts by weight, whereby the warpage was not problematic as being within 2 mm, but the moldability was poor.

However, when the talc component is added, cracking of embossed letters is likely to take place during the embossing operation. Also in such a case, it is possible to prevent cracking of embossed letters by adding a methyl methacrylate/butadiene/styrene resin. The following compositions were prepared by adding a methyl methacrylate/butadiene/styrene resin to the composition having talc added to the composition of the above Example 1.

EXAMPLE 14

The methyl methacrylate/butadiene/styrene resin was added in an amount of 1 part by weight to 100 parts by weight of the composition having 0.5 part by weight of talc added to 100 parts by weight of the composition of Example 1.

EXAMPLE 15

The methyl methacrylate/butadiene/styrene resin was added in an amount of 1 part by weight to 100 parts by weight of the composition having 1 part by weight of talc added to 100 parts by weight of the composition of Example 1.

EXAMPLE 16

The methyl methacrylate/butadiene/styrene resin was added in an amount of 2 parts by weight to 100 parts by weight of the composition having 5 parts by weight of talc added to 100 parts by weight of the composition of Example 1.

EXAMPLE 17

The methyl methacrylate/butadiene/styrene resin was added in an amount of 2.5 parts by weight to 100 parts by weight of the composition having 10 parts by weight of talc added to 100 parts by weight of the composition of Example 1.

EXAMPLE 18

The methyl methacrylate/butadiene/styrene resin was added in an amount of 5 parts by weight to 100 parts by weight of the composition having 15 parts by weight of talc added to 100 parts by weight of the composition of Example 1.

EXAMPLE 19

The methyl methacrylate/butadiene/styrene resin was added in an amount of 20 parts by weight to 100 parts by weight of the composition having 25 parts by weight of talc added to 100 parts by weight of the composition of Example 1.

COMPARATIVE EXAMPLE 5

The methyl methacrylate/butadiene/styrene resin was added in an amount of 22 parts by weight to 100 parts by weight of the composition having 27 parts by weight of talc added to 100 parts by weight of the composition of Example 1.

Each of the above compositions was heated and kneaded by an injection molding machine and molded by an injection molding method into a card for IC card having a thickness of about 0.8 mm, and embossing was applied to the card for IC card by means of an embossing machine. Then, the card was colored with a chipper (coloring machine). The warpage of the card was measured in accordance with JIS X6301, and the results are shown in Table 4. In Table 4, warpage A to D are as defined above.

TABLE 4

|  | War-page A (mm) | War-page B (mm) | War-page C (mm) | War-page D (mm) | Mold-ability | Cracking of embossed letters |
|---|---|---|---|---|---|---|
| Example 14 | 2.4 | 2.0 | 2.5 | 2.2 | ◯ | ⊚ |
| Example 15 | 2.4 | 2.0 | 2.6 | 2.1 | ◯ | ⊚ |
| Example 16 | 2.3 | 1.9 | 2.4 | 2.1 | ◯ | ⊚ |
| Example 17 | 1.8 | 1.6 | 2.3 | 2.0 | ◯ | ◯ |
| Example 18 | 1.7 | 1.5 | 2.2 | 1.9 | ◯ | ◯ |
| Example 19 | 1.6 | 1.4 | 2.2 | 1.8 | ◯ | ◯ |
| Comparative Example 5 | 1.5 | 1.3 | 2.0 | 1.7 | x | ◯–x |

It is evident from Table 4 that cards for IC cards injection molded from the compositions wherein talc was added in an amount of from 0.5 to 25 parts by weight and a methyl methacrylate/butadiene/styrene resin was further added in an amount of from 1 to 20 parts by weight, satisfy the requirement that the warpage after the embossing operation or after coloring by the chipper is within a range of 2 mm as stipulated in JIS X6301, and they are satisfactory also with respect to the moldability and the state of cracking of embossed letters.

Then, to examine the influence over the warpage of the average particle size (as measured by a light transmitting centrifugal sedimentation method by means of SA-CP3, manufactured by Shimadzu Corporation) of the talc, the following compositions were prepared in which the average particle size of 10 $\mu$m of the talc in the above Example 11 was changed.

EXAMPLE 20

The average particle size of the talc in the composition of Example 11 was changed to about 4 $\mu$m.

EXAMPLE 21

The average particle size of the talc in the composition of Example 11 was changed to about 6 $\mu$m.

EXAMPLE 22

The average particle size of the talc in the composition of Example 11 was changed to about 22 $\mu$m.

EXAMPLE 23

The average particle size of the talc in the composition of Example 11 was changed to about 30 $\mu$m.

COMPARATIVE EXAMPLE 6

The average particle size of the talc in the composition of Example 11 was changed to about 32 $\mu$m.

Each of the above compositions were heated and kneaded by an injection molding machine and formed by an injection molding method into a card for IC card having a thickness of about 0.8 mm. Embossing was applied to the card for IC card by means of an embossing machine, and then the card was colored by a chipper (coloring machine). The warpage of the card was measured in accordance with JIS X6301, and the results are shown in Table 5. In Table 5, warpage A represents the amount of warpage (mm) after the embossing operation by means of a manual embossing machine, and warpage B represents the amount of warpage (mm) after the embossing operation by means of a manual embossing machine, followed by coloring by the chipper. Warpage C represents the amount of warpage (mm) after the embossing operation by means of an electric embossing machine, and warpage D represents the amount of warpage (mm) after the embossing operation by means of an electric embossing machine, following by coloring by the chipper.

TABLE 5

|  | War-page A (mm) | War-page B (mm) | War-page C (mm) | War-page D (mm) | Mold-ability | Cracking of embossed letters |
|---|---|---|---|---|---|---|
| Example 11 | 1.7 | 1.5 | 2.2 | 1.9 | ◯ | ◯–x |
| Example 20 | 2.2 | 2.0 | 2.4 | 2.2 | ⊚ | ◯ |
| Example 21 | 2.1 | 1.9 | 2.3 | 2.1 | ⊚ | ◯ |
| Example 22 | 1.5 | 1.3 | 1.9 | 1.7 | ◯ | ◯–x |
| Example 23 | 1.4 | 1.2 | 1.8 | 1.6 | ◯–x | ◯–x |
| Comparative Example 6 | 1.4 | 1.2 | 1.7 | 1.5 | x | x |

It is evident from Table 5 that when the average particle size of the talc is from about 4 to 30 $\mu$m, the warpage after the embossing operation or after coloring by the chipper satisfies the requirement of the amount of warpage being within 2 mm as stipulated in JIS X6301, and the moldability is also satisfactory. In Comparative Example 6, the average particle size of the talc was about 32 $\mu$m, whereby the warpage was not problematic as being within 2 mm, but the moldability was poor.

A method for further reducing the warpage (curling) was studied, and as a result, kaolin such as Kaolin Clay, tradename, manufactured by Shiraishi Calcium K.K. or Kaobrite, tradename, manufactured by Shiraishi Kogyo K.K., was found to be effective for reducing the warpage (curling). On the basis of this discovery, the following compositions were prepared by adding kaolin having an average particle size of 4 $\mu$m to the composition of the above Example 1.

EXAMPLE 24

Kaolin was added in an amount of 3 parts by weight to 100 parts by weight of the composition of Example 1.

EXAMPLE 25

Kaolin was added in an amount of 5 parts by weight to 100 parts by weight of the composition of Example 1.

EXAMPLE 26

Kaolin was added in an amount of 10 parts by weight to 100 parts by weight of the composition of Example 1.

EXAMPLE 27

Kaolin was added in an amount of 25 parts by weight to 100 parts by weight of the composition of Example 1.

COMPARATIVE EXAMPLE 7

Kaolin was added in an amount of 27 parts by weight to 100 parts by weight of the composition of Example 1.

Each of the above compositions was heated and kneaded by an injection molding machine and molded by an injection molding method into a card for IC card having a thickness of about 0.8 mm. Embossing was applied to the card for IC card by means of an embossing machine, and then, the card was colored by a chipper (coloring machine). The warpage of the card was measured in accordance with JIS X6301, and the results are shown in Table 6. In Table 6, warpage A is the amount of warpage (mm) after the embossing operation by means of a manual embossing machine, and warpage B is the amount of warpage (mm) after the embossing operation by means of a manual embossing machine, followed by coloring by the chipper.

TABLE 6

|  | Warpage A (mm) | Warpage B (mm) | Mold-ability | Cracking of embossed letters |
| --- | --- | --- | --- | --- |
| Example 24 | 2.3 | 2.1 | ○ | ○ |
| Example 25 | 2.1 | 1.9 | ○ | ○–x |
| Example 26 | 2.0 | 1.8 | ○ | ○–x |
| Example 27 | 1.8 | 1.6 | ○–x | ○–x |
| Comparative Example 7 | 1.7 | 1.5 | x | x |

It is evident from Table 6 that when the kaolin component is added in an amount of from 5 to 25 parts by weight, the warpage after the embossing operation or after coloring by the chipper, satisfies the requirement of the warpage being within 2 mm as stipulated in JIS X6301, and the moldability is also satisfactory. In Comparative Example 7, kaolin was added in an amount of 27 parts by weight, whereby the warpage was not problematic as being within 2 mm, but the moldability was poor.

However, when the kaolin component is added, cracking of embossed letters is likely to result during the embossing operation. In such a case, it is possible to prevent cracking of embossed letters also by adding a methyl methacrylate/butadiene/styrene resin. The following compositions were prepared by adding a methyl methacrylate/butadiene/styrene resin further to the composition having kaolin added to the composition of the above Example 1.

EXAMPLE 28

The methyl methacrylate/butadiene/styrene resin was added in an amount of 1 part by weight to 100 parts by weight of the composition having 3 parts by weight of kaolin added to 100 parts by weight of the composition of Example 1.

EXAMPLE 29

The methyl methacrylate/butadiene/styrene resin was added in an amount of 1 part by weight to 100 parts by weight of the composition having 5 parts by weight of kaolin added to 100 parts by weight of the composition of Example 1.

EXAMPLE 30

The methyl methacrylate/butadiene/styrene resin was added in an amount of 2 parts by weight to 100 parts by weight of the composition having 5 parts by weight of kaolin added to 100 parts by weight of the composition of Example 1.

EXAMPLE 31

The methyl methacrylate/butadiene/styrene resin was added in an amount of 25 parts by weight to 100 parts by weight of the composition having 10 parts by weight of kaolin added to 100 parts by weight of the composition of Example 1.

EXAMPLE 32

The methyl methacrylate/butadiene/styrene resin was added in an amount of 5 parts by weight to 100 parts by weight of the composition having 15 parts by weight of kaolin added to 100 parts by weight of the composition of Example 1.

EXAMPLE 33

The methyl methacrylate/butadiene/styrene resin was added in an amount of 20 parts by weight to 100 parts by weight of the composition having 25 parts by weight of kaolin added to 100 parts by weight of the composition of Example 1.

COMPARATIVE EXAMPLE 8

The methyl methacrylate/butadiene/styrene resin was added in an amount of 22 parts by weight to 100 parts by weight of the composition having 27 parts by weight of kaolin added to 100 parts by weight of the composition of Example 1.

Each of the above compositions was heated and kneaded by an injection molding machine and molded by an injection molding method into a card for IC card having a thickness of about 0.8 mm, and embossing was applied to the card for IC card by means of an embossing machine. Then, the card was colored by a chipper (coloring machine). The warpage of the card was measured in accordance with JIS X6301, and the results are shown in Table 7. In Table 7, warpage A and warpage B are as defined above.

TABLE 7

|  | Warpage A (mm) | Warpage B (mm) | Mold-ability | Cracking of embossed letters |
| --- | --- | --- | --- | --- |
| Example 28 | 2.4 | 2.2 | ○ | ⊙ |
| Example 29 | 2.2 | 2.0 | ○ | ⊙ |
| Example 30 | 2.2 | 2.0 | ○ | ⊙ |
| Example 31 | 2.1 | 1.9 | ○ | ⊙ |
| Example 32 | 1.9 | 1.7 | ○–x | ○ |
| Example 33 | 1.8 | 1.6 | ○–x | ○ |
| Comparative Example 8 | 1.8 | 1.6 | x | ○–x |

It is evident from Table 7 that cards for IC cards injection molded from the compositions wherein kaolin was added in an amount of from 5 to 25 parts by weight and the methyl methacrylate/butadiene/styrene resin was further added in an amount of from 1 to 20 parts by weight, satisfy the requirement that the warpage of the cards after the embossing operation or after coloring by the chipper is within 2 mm as stipulated in JIS X6301, and they have no problem with respect to the moldability or cracking of embossed letters.

Then, in order to examine the influence of the average particle size (as measured by a light transmitting centrifugal sedimentation method by means of SA-CP3, manufactured by Shimadzu Corporation) of kaolin over the warpage, the following compositions were prepared by changing the average particle size of 4 µm of the kaolin in the above Example 26.

EXAMPLE 34

The average particle size of the kaolin in the composition of Example 26 was changed to about 0.5 µm.

EXAMPLE 35

The average particle size of the kaolin in the composition of Example 26 was changed to about 2 µm.

EXAMPLE 36

The average particle size of the kaolin in the composition of Example 26 was changed to about 8 µm.

EXAMPLE 37

The average particle size of the kaolin in the composition of Example 26 was changed to about 10 µm.

COMPARATIVE EXAMPLE 9

The average particle size of the kaolin in the composition of Example 26 was changed to about 12 µm.

Each of the above compositions was heated and kneaded by an injection molding machine and molded by an injection molding method into a card for IC card having a thickness of about 0.8 mm, and embossing was applied to the card for IC card by means of an embossing machine. Then, the card was colored by a chipper (coloring machine). The warpage of the card was measured in accordance with JIS X6301, and the results are shown in Table 8. In Table 8, warpage A is the amount of warpage (mm) after the embossing operation by means of a manual embossing machine, and warpage B is the amount of warpage (mm) after the embossing operation by means of a manual embossing machine, followed by coloring by the chipper.

TABLE 8

|  | Warpage A (mm) | Warpage B (mm) | Mold-ability | Cracking of embossed letters |
| --- | --- | --- | --- | --- |
| Example 26 | 2.0 | 1.8 | ○ | ○–x |
| Example 34 | 2.2 | 2.0 | ○ | ○ |
| Example 35 | 2.1 | 1.9 | ○ | ○ |
| Example 36 | 1.9 | 1.7 | ○ | ○–x |
| Example 37 | 1.8 | 1.6 | ○–x | ○–x |
| Comparative Example 9 | 1.7 | 1.5 | x | x |

It is evident from Table 8 that when the average particle size of kaolin is within a range of from about 0.5 to 10 µm, the warpage after the embossing operation or after coloring by the chipper satisfies the requirement of the amount of warpage being within 2 mm as stipulated in JIS X6301, and the moldability is also satisfactory. In Comparative Example 6, the average particle size of talc was about 12 µm, whereby the warpage was not problematic as being within 2 mm, but the moldability was poor.

Further, a method for reducing the warpage (curling) was studied, and as a result, aluminum type plate-like fine crystals (Mizukalac, tradename, manufactured by Mizusawa Kagaku Kogyo K.K.) were found to reduce the warpage (curling). On the basis of this discovery, the following compositions were prepared by adding aluminum type plate-like fine crystals to the composition of the above Example 1.

EXAMPLE 38

Aluminum type plate-like fine crystals were added in an amount of 3 parts by weight to 100 parts by weight of the composition of Example 1.

EXAMPLE 39

Aluminum type plate-like fine crystals were added in an amount of 5 parts by weight to 100 parts by weight of the composition of Example 1.

EXAMPLE 40

Aluminum type plate-like fine crystals were added in an amount of 15 parts by weight to 100 parts by weight of the composition of Example 1.

EXAMPLE 41

Aluminum type plate-like fine crystals were added in an amount of 25 parts by weight to 100 parts by weight of the composition of Example 1.

COMPARATIVE EXAMPLE 10

Aluminum type plate-like fine crystals were added in an amount of 27 parts by weight to 100 parts by weight of the composition of Example 1.

Each of the above compositions was heated and kneaded by an injection molding machine, and molded by an injection molding method into a card for IC card having a thickness of about 0.8 mm, and embossing was applied to the card for IC card by means of an embossing machine. Then, the card was colored by a chipper (coloring machine). The warpage of the card was measured in accordance with JIS X6301, and the results are shown in Table 9. In Table 9, warpage A is the amount of warpage (mm) after the embossing operation by means of a manual embossing machine, and warpage B represents the amount of warpage (mm) after the embossing treatment by means of a manual embossing machine, followed by coloring by the chipper.

TABLE 9

|  | Warpage A (mm) | Warpage B (mm) | Mold-ability | Cracking of embossed letters |
| --- | --- | --- | --- | --- |
| Example 38 | 2.3 | 2.1 | ○ | ○ |
| Example 39 | 2.1 | 1.9 | ○ | ○ |
| Example 40 | 2.0 | 1.8 | ○–x | ○–x |
| Example 41 | 1.9 | 1.7 | ○–x | ○–x |
| Comparative Example 10 | 1.8 | 1.6 | x | x |

It is evident from Table 9 that when an aluminum type plate-like fine crystal component is added in an amount of from 5 to 25 parts by eight, the warpage after the embossing operation or after coloring by the chipper, satisfies the requirement of the amount of warpage being within 2 mm as stipulated in JIS X6301, and the moldability is also satisfactory. In Comparative Example 10, the aluminum type plate-like fine crystal component was added in an amount of 27 parts by weight, whereby the warpage was not problematic as being within 2 mm, but the moldability was poor.

However, when the aluminum type plate-like fine crystals component is added, cracking of embossed letters is likely to take place during the embossing operation. Also in such a case, it is possible to prevent cracking of embossed letters by adding a methyl methacrylate/butadiene/styrene resin. The following compositions were prepared by adding the methyl methacrylate/butadiene/styrene resin further to the composition having the aluminum type plate-like fine crystal component added to the composition of the above Example 1.

EXAMPLE 42

The methyl methacrylate/butadiene/styrene resin was added in an amount of 1 part by weight to 100 parts by weight of the composition having 3 parts by weight of the aluminum type plate-like fine crystal component added to 100 parts by weight of the composition of Example 1.

EXAMPLE 43

The methyl methacrylate/butadiene/styrene resin was added in an amount of 1 part by weight to 100 parts by weight of the composition having 5 parts by weight of the aluminum type plate-like fine crystal component added to 100 parts by weight of the composition of Example 1.

EXAMPLE 44

The methyl methacrylate/butadiene/styrene resin was added in an amount of 2 parts by weight to 100 parts by weight of the composition having 5 parts by weight of the aluminum type plate-like fine crystal component added to 100 parts by weight of the composition of Example 1.

EXAMPLE 45

The methyl methacrylate/butadiene/styrene resin was added in an amount of 25 parts by weight to 100 parts by weight of the composition having 10 parts by weight of the aluminum type plate-like fine crystal component added to 100 parts by weight of the composition of Example 1.

EXAMPLE 46

The methyl methacrylate/butadiene/styrene resin was added in an amount of 5 parts by weight to 100 parts by weight of the composition having 15 parts by weight of the aluminum type plate-like fine crystal component added to 100 parts by weight of the composition of Example 1.

EXAMPLE 47

The methyl methacrylate/butadiene/styrene resin was added in an amount of 20 parts by weight to 100 parts by weight of the composition having 25 parts by weight of the aluminum type plate-like fine crystal component added to 100 parts by weight of the composition of Example 1.

COMPARATIVE EXAMPLE 11

The methyl methacrylate/butadiene/styrene resin was added in an amount of 22 parts by weight to 100 parts by weight of the composition having 27 parts by weight of the aluminum type plate-like fine crystal component added to 100 parts by weight of the composition of Example 1.

Each of the above compositions was heated and kneaded by an injection molding machine and molded by an injection molding method into a card for IC card having a thickness of about 0.8 mm, and embossing was applied to the card for IC card by means of an embossing machine. Then, the card was colored by a chipper (coloring machine). The warpage of the card was measured in accordance with JIS X6301, and the results are shown in Table 10. In Table 10, warpage A and warpage B are as defined above.

TABLE 10

|  | Warpage A (mm) | Warpage B (mm) | Mold-ability | Cracking of embossed letters |
|---|---|---|---|---|
| Example 42 | 2.4 | 2.2 | ○ | ⊙ |
| Example 43 | 2.2 | 2.0 | ○ | ⊙ |
| Example 44 | 2.2 | 2.0 | ○ | ⊙ |
| Example 45 | 2.1 | 1.9 | ○ | ⊙ |
| Example 46 | 2.1 | 1.9 | ○ | ○ |
| Example 47 | 2.0 | 1.8 | ○–x | ○ |
| Comparative Example 11 | 1.9 | 1.7 | x | ○–x |

It is evident from Table 10 that cards for IC cards injection molded from the compositions wherein aluminum type plate-like fine crystals were added in an amount of from 5 to 25 parts by weight and the methyl methacrylate/butadiene/styrene resin was further added in an amount of from 1 to 20 parts by weight, satisfy the requirement that the warpage of the card after the embossing operation or after coloring by the chipper is within 2 mm as stipulated in JIS X6301, and they have no problem with respect to the moldability or cracking of embossed letters.

EXAMPLE 48

| Content of the acrylic rubber component | 3 mol % |
|---|---|
| Content of the acrylonitrile component | 50 mol % |
| Content of the styrene component | 47 mol % |
| MI | 10 g/10 min |

EXAMPLE 49

| Content of the acrylic rubber component | 5 mol % |
|---|---|
| Content of the acrylonitrile component | 49 mol % |
| Content of the styrene cornponent | 46 mol % |
| MI | 5 g/10 min |

EXAMPLE 50

| Content of the acrylic rubber component | 10 mol % |
|---|---|
| Content of the acrylonitrile component | 47 mol % |
| Content of the styrene component | 43 mol % |
| MI | 12 g/10 min |

EXAMPLE 51

| Content of the acrylic rubber component | 15 mol % |
|---|---|
| Content of the acrylonitrile component | 44 mol % |
| Content of the styrene component | 41 mol % |
| MI | 7 g/10 min |

COMPARATIVE EXAMPLE 12

| | |
|---|---|
| Content of the acrylic rubber component | 2 mol % |
| Content of the acrylonitrile component | 51 mol % |
| Content of the styrene component | 47 mol % |
| MI | 25 g/10 min |

COMPARATIVE EXAMPLE 13

| | |
|---|---|
| Content of the acrylic rubber component | 13 mol % |
| Content of the acrylonitrile component | 45 mol % |
| Content of the styrene component | 42 mol % |
| MI | 3 g/10 min |

Each of the above compositions was heated and kneaded by an injection molding machine and molded by an injection molding method into a card for IC card having a thickness of about 0.8 mm, and embossing was applied to the card for IC card.

Cards for IC cards molded from the respective compositions of the above Examples and Comparative Examples, were evaluated in accordance with the following evaluation methods, and the results are shown in Table 11.

(1) The state of cracking of embossed letters at the time of the embossing operation The card was evaluated in comparison with a card for IC card injection molded from a polyvinyl chloride resin (hereinafter referred to as a conventional product).

⊚: superior, ○: equivalent, ×: inferior (2) Moldability

⊚: excellent, ○: good, ×: poor (3) Emboss reduction

After the embossing operation, the embossed card was heated to 90° C. for 30 minutes, whereupon percent reduction in the height of the embossed portions due to the deformation was evaluated in comparison with the conventional product (a card for IC card injection molded from a polyvinyl chloride resin).

TABLE 11

| | Cracking of embossed letters | Moldability | Emboss reduction (%) |
|---|---|---|---|
| Example 48 | ○ | ○ | 20 |
| Example 49 | ○ | ○ | 21 |
| Example 50 | ○ | ⊚ | 23 |
| Example 51 | ⊚ | ○ | 24 |
| Comparative Example 12 | × | ⊚ | 19 |
| Comparative Example 13 | ⊚ | × | 24 |
| Conventional product | — | — | 92 |

It is evident from Table 11 that cards for IC cards injection molded from the compositions of Examples 48 to 51, wherein the content of the acrylic rubber component was from 3 to 15 mol %, the content of the acrylonitrile component was from 40 to 55 mol %, the content of the styrene component was from 40 to 50 mol %, and MI was at least 5 g/10 min, are equal or superior to the conventional product (a card for IC card injection molded from a polyvinyl chloride resin) in the prevention of cracking of embossed letters at the time of the embossing operation, and they are also good or excellent in the moldability.

In Comparative Example 12, the content of the acrylic rubber component was 2 mol %, and MI was 25 g/10 min. As MI was at least 5 g/l0 min. the moldability was excellent, but as the content of the acrylic rubber component was less than 5 mol %, cracking of embossed letters was observed during the embossing operation, and thus the product was inferior to the conventional product (a card for IC card injection molded from a polyvinyl chloride resin).

In Comparative Example 13, the content of the acrylic rubber component was 13 mol %, and MI was 3 g/10 min. As the content of the acrylic rubber component was within a range of from 3 to 15 mol %, the product was superior to the conventional product (a card for IC card injection molded from a polyvinyl chloride resin) in the prevention of cracking of embossed letters at the time of the embossing operation, but as MI was less than 5 g/10 min, the moldability was poor.

The foregoing evaluation of the embossing operation was carried out by means of a manual embossing machine. When evaluation was carried out by an electric embossing machine, cracking of embossed letters was found to occur sometimes. Therefore, the following compositions were prepared by adding a methyl methacrylate/butadiene/styrene resin to the composition of the above Example 48 wherein:

| | |
|---|---|
| Content of the acrylic rubber component | 3 mol % |
| Content of the acrylonitrile component | 50 mol % |
| Content of the styrene component | 47 mol % |
| MI | 10 g/10 min |

EXAMPLE 52

The methyl methacrylate/butadiene/styrene resin was added in an amount of 0.5 part by weight to 100 parts by weight of the composition of Example 48.

EXAMPLE 53

The methyl methacrylate/butadiene/styrene resin was added in an amount of 5 parts by weight to 100 parts by weight of the composition of Example 48.

EXAMPLE 54

The methyl methacrylate/butadiene/styrene resin was added in an amount of 15 parts by weight to 100 parts by weight of the composition of Example 48.

EXAMPLE 55

The methyl methacrylate/butadiene/styrene resin was added in an amount of 25 parts by weight to 100 parts by weight of the composition of Example 48.

COMPARATIVE EXAMPLE 14

The methyl methacrylate/butadiene/styrene resin was added in an amount of 27 parts by weight to 100 parts by weight of the composition of Example 48.

Each of the above compositions were heated and kneaded by an injection molding machine and molded by an injection molding method into a card for IC card having a thickness of about 0.8 mm, and embossing was applied to the card for IC card. Using an electric embossing machine, evaluation was carried out in the same manner as described above, and the results are shown in Table 2.

TABLE 12

|  | Cracking of embossed letters | Moldability | Emboss reduction (%) |
| --- | --- | --- | --- |
| Example 52 | ○ | ○ | 22 |
| Example 53 | ○ | ○ | 24 |
| Example 54 | ⊚ | ○ | 27 |
| Example 55 | ⊚ | ○ | 29 |
| Comparative Example 14 | ⊚ | x | 30 |

It is evident from Table 12 that cards for IC cards injection molded from the compositions of Examples 52 to 55 wherein the methyl methacrylate/butadiene/styrene resin was added in an amount of from 0.5 to 25 parts by weight, are improved in the prevention of cracking of embossed letters. In Comparative Example 14, the methyl methacrylate/butadiene/styrene resin was added in an amount of 27 parts by weight, whereby the prevention of cracking of embossed letters was improved, but the moldability was poor.

Further, a method for reducing the warpage (curling) of the plastic card during the embossing operation, was studied, and as a result talc was found to reduce the warpage (curling). On the basis of this discovery, the following compositions were prepared by adding talc to the composition of the above Example 48 wherein:

| Content of the acrylic rubber component | 3 mol % |
| --- | --- |
| Content of the acrylonitrile component | 50 mol % |
| Content of the styrene component | 47 mol % |
| MI | 10 g/10 min |

EXAMPLE 56

Talc was added in an amount of 0.5 part by weight to 100 parts by weight of the composition of Example 48.

EXAMPLE 57

Talc was added in an amount of 5 parts by weight to 100 parts by weight of the composition of Example 48.

EXAMPLE 58

Talc was added in an amount of 10 parts by weight to 100 parts by weight of the composition of Example 48.

EXAMPLE 59

Talc was added in an amount of 20 parts by weight to 100 parts by weight of the composition of Example 48.

EXAMPLE 60

Talc was added in an amount of 25 parts by weight to 100 parts by weight of the composition of Example 48.

COMPARATIVE EXAMPLE 15

Talc was added in an amount of 27 parts by weight to 100 parts by weight of the composition of Example 48.

Each of the above compositions was heated and kneaded by an injection molding machine and molded by an injection molding method into a card for IC card having a thickness of about 0.8 mm, and embossing was applied to the card for IC card by means of an embossing machine. Then, the card was colored by a chipper (coloring machine). The warpage of the card was measured in accordance with JIS X6301, and the results are shown in Table 13. In Table 13, warpage A represents the amount of warpage (mm) after the embossing operation by means of a manual embossing machine, and warpage B represents the amount of warpage (mm) after the embossing operation by means of a manual embossing machine, followed by coloring by the chipper. Warpage C represents the amount of warpage (mm) after the embossing operation by means of an electric embossing machine, and warpage D represents the amount of warpage (mm) after the embossing operation by means of an electric embossing machine, followed by coloring by the chipper.

TABLE 13

|  | Warpage A (mm) | Warpage B (mm) | Warpage C (mm) | Warpage D (mm) | Moldability | Cracking of embossed letters |
| --- | --- | --- | --- | --- | --- | --- |
| Example 48 | 2.5 | 2.3 | 2.7 | 2.5 | ○ | ○ |
| Example 56 | 2.2 | 1.9 | 2.3 | 2.1 | ○ | ○–x |
| Example 57 | 2.1 | 1.8 | 2.3 | 2.0 | ○ | ○–x |
| Example 58 | 1.9 | 1.6 | 2.2 | 1.9 | ○ | ○–x |
| Example 59 | 1.5 | 1.3 | 2.1 | 1.8 | ○ | ○–x |
| Example 60 | 1.3 | 1.0 | 1.9 | 1.6 | ○–x | ○–x |
| Comparative Example 15 | 1.2 | 0.9 | 1.8 | 1.5 | x | x |

It is evident from Table 13 that when the talc component is added in an amount of from 0.5 to 25 parts by weight, the warpage after the embossing operation or after coloring by the chipper satisfies the requirement of the amount of warpage being within 2 mm as stipulated in JIS X6301, and the moldability is also satisfactory. In Comparative Example 15, talc was added in an amount of 27 parts by weight, whereby the warpage was not problematic as being within 2 mm, but the moldability was poor.

However, when the talc component is added, cracking of embossed letters is likely to take place during the embossing operation. Also in such a case, it is possible to prevent cracking of embossed letters by adding a methyl methacrylate/butadiene/styrene resin. The following compositions were prepared by adding a methyl methacrylate/butadiene/styrene resin to the composition having talc added to the composition of the above Example 48.

EXAMPLE 61

The methyl methacrylate/butadiene/styrene resin was added in an amount of 1 part by weight to 100 parts by weight of the composition having 0.5 part by weight of talc added to 100 parts by weight of the composition of Example 48.

EXAMPLE 62

The methyl methacrylate/butadiene/styrene resin was added in an amount of 1 part by weight to 100 parts by weight of the composition having 1 part by weight of talc added to 100 parts by weight of the composition of Example 48.

EXAMPLE 63

The methyl methacrylate/butadiene/styrene resin was added in an amount of 2 parts by weight to 100 parts by weight of the composition having 5 parts by weight of talc added to 100 parts by weight of the composition of Example 48.

EXAMPLE 64

The methyl methacrylate/butadiene/styrene resin was added in an amount of 2.5 parts by weight to 100 parts by weight of the composition having 10 parts by weight of talc added to 100 parts by weight of the composition of Example 48.

EXAMPLE 65

The methyl methacrylate/butadiene/styrene resin was added in an amount of 5 parts by weight to 100 parts by weight of the composition having 15 parts by weight of talc added to 100 parts by weight of the composition of Example 48.

EXAMPLE 66

The methyl methacrylate/butadiene/styrene resin was added in an amount of 20 parts by weight to 100 parts by weight of the composition having 25 parts by weight of talc added to 100 parts by weight of the composition of Example 48.

COMPARATIVE EXAMPLE 16

The methyl methacrylate/butadiene/styrene resin was added in an amount of 22 parts by weight to 100 parts by weight of the composition having 27 parts by weight of talc added to 100 parts by weight of the composition of Example 48.

Each of the above compositions was heated and kneaded by an injection molding machine and molded by an injection molding method into a card for IC card having a thickness of about 0.8 mm, and embossing was applied to the card for IC card by means of an embossing machine.

Then, the card was colored with a chipper (coloring machine). The warpage of the card was measured in accordance with JIS X6301, and the results are shown in Table 14. In Table 14, warpage A to D are as defined above.

TABLE 14

| | Warpage A (mm) | Warpage B (mm) | Warpage C (mm) | Warpage D (mm) | Moldability | Cracking of embossed letters |
|---|---|---|---|---|---|---|
| Example 61 | 2.3 | 2.0 | 2.5 | 2.2 | ○ | ⊚ |
| Example 62 | 2.2 | 2.0 | 2.5 | 2.2 | ○ | ⊚ |
| Example 63 | 2.1 | 1.9 | 2.4 | 2.1 | ○ | ⊚ |
| Example 64 | 2.0 | 1.7 | 2.3 | 2.0 | ○ | ○ |
| Example 65 | 1.8 | 1.6 | 2.2 | 1.9 | ○ | ○ |
| Example 66 | 1.7 | 1.5 | 2.1 | 1.8 | ○–x | ○ |
| Comparative Example 16 | 1.6 | 1.4 | 2.0 | 1.7 | x | ○–x |

It is evident from Table 14 that cards for IC cards injection molded from the compositions wherein talc was added in an amount of from 0.5 to 25 parts by weight and a methyl methacrylate/butadiene/styrene resin was further added in an amount of from 1 to 20 parts by weight, satisfy the requirement that the warpage after the embossing operation or after coloring by the chipper is within a range of 2 mm as stipulated in JIS X6301, and they are satisfactory also with respect to the moldability and the state of cracking of embossed letters.

Then, to examine the influence over the warpage of the average particle size (as measured by a light transmitting centrifugal sedimentation method by means of SA-CP3, manufactured by Shimadzu Corporation) of the talc, the following compositions were prepared in which the average particle size of 10 μm of the talc in the above Example 58 was changed.

EXAMPLE 67

The average particle size of the talc in the composition of Example 58 was changed to about 4 μm.

EXAMPLE 68

The average particle size of the talc in the composition of Example 58 was changed to about 6 μm.

EXAMPLE 69

The average particle size of the talc in the composition of Example 58 was changed to about 22 μm.

EXAMPLE 70

The average particle size of the talc in the composition of Example 58 was changed to about 30 μm.

COMPARATIVE EXAMPLE 17

The average particle size of the talc in the composition of Example 58 was changed to about 32 μm.

Each of the above compositions were heated and kneaded by an injection molding machine and formed by an injection molding method into a card for IC card having a thickness of about 0.8 mm. Embossing was applied to the card for IC card by means of an embossing machine, and then the card was colored by a chipper (coloring machine). The warpage of the card was measured in accordance with JIS X6301, and the results are shown in Table 15. In Table 15, warpage A represents the amount of warpage (mm) after the embossing operation by means of a manual embossing machine, and warpage B represents the amount of warpage (mm) after the embossing operation by means of a manual embossing machine, followed by coloring by the chipper. Warpage C represents the amount of warpage (mm) after the embossing operation by means of an electric embossing machine, and warpage D represents the amount of warpage (mm) after the embossing operation by means of an electric embossing machine, following by coloring by the chipper.

TABLE 15

| | Warpage A (mm) | Warpage B (mm) | Warpage C (mm) | Warpage D (mm) | Moldability | Cracking of embossed letters |
|---|---|---|---|---|---|---|
| Example 58 | 1.9 | 1.6 | 2.2 | 1.9 | ○ | ○–x |
| Example 67 | 2.3 | 2.0 | 2.4 | 2.3 | ⊚ | ○ |
| Example 68 | 2.1 | 1.9 | 2.3 | 2.2 | ⊚ | ○ |
| Example 69 | 1.7 | 1.4 | 2.1 | 1.8 | ○ | ○–x |
| Example 70 | 1.5 | 1.3 | 1.9 | 1.7 | ○–x | ○–x |
| Comparative Example 17 | 1.4 | 1.2 | 1.8 | 1.6 | x | x |

It is evident from Table 15 that when the average particle size of the talc is from about 4 to 30 μm, the warpage after the embossing operation or after coloring by the chipper satisfies the requirement of the amount of warpage being within 2 mm as stipulated in JIS X6301, and the moldability is also satisfactory. In Comparative Example 17, the average particle size of the talc was about 32 μm, whereby the warpage was not problematic as being within 2 mm, but the moldability was poor.

A method for further reducing the warpage (curling) was studied, and as a result, kaolin such as Kaolin Clay, tradename, manufactured by Shiraishi Calcium K.K. or Kaobrite, tradename, manufactured by Shiraishi Kogyo K.K., was found to be effective for reducing the warpage (curling). On the basis of this discovery, the following compositions were prepared by adding kaolin having an average particle size of 4 μm to the composition of the above Example 48.

EXAMPLE 71

Kaolin was added in an amount of 3 parts by weight to 100 parts by weight of the composition of Example 48.

EXAMPLE 72

Kaolin was added in an amount of 5 parts by weight to 100 parts by weight of the composition of Example 48.

EXAMPLE 73

Kaolin was added in an amount of 10 parts by weight to 100 parts by weight of the composition of Example 48.

EXAMPLE 74

Kaolin was added in an amount of 25 parts by weight to 100 parts by weight of the composition of Example 48.

COMPARATIVE EXAMPLE 18

Kaolin was added in an amount of 27 parts by weight to 100 parts by weight of the composition of Example 48.

Each of the above compositions was heated and kneaded by an injection molding machine and molded by an injection molding method into a card for IC card having a thickness of about 0.8 mm. Embossing was applied to the card for IC card by means of an embossing machine, and then, the card was colored by a chipper (coloring machine). The warpage of the card was measured in accordance with JIS X6301, and the results are shown in Table 16. In Table 16, warpage A is the amount of warpage (mm) after the embossing operation by means of a manual embossing machine, and warpage B is the amount of warpage (mm) after the embossing operation by means of a manual embossing machine, followed by coloring by the chipper.

TABLE 16

|  | Warpage A (mm) | Warpage B (mm) | Mold-ability | Cracking of embossed letters |
| --- | --- | --- | --- | --- |
| Example 71 | 2.3 | 2.1 | ○ | ○ |
| Example 72 | 2.1 | 1.9 | ○ | ○–x |
| Example 73 | 2.0 | 1.8 | ○ | ○–x |
| Example 74 | 1.8 | 1.6 | ○–x | ○–x |
| Comparative Example 18 | 1.7 | 1.5 | x | x |

It is evident from Table 16 that when the kaolin component is added in an amount of from 5 to 25 parts by weight, the warpage after the embossing operation or after coloring by the chipper, satisfies the requirement of the warpage being within 2 mm as stipulated in JIS X6301, and the moldability is also satisfactory. In Comparative Example 18, kaolin was added in an amount of 27 parts by weight, whereby the warpage was not problematic as being within 2 mm, but the moldability was poor.

However, when the kaolin component is added, cracking of embossed letters is likely to result during the embossing operation. In such a case, it is possible to prevent cracking of embossed letters also by adding a methyl methacrylate/butadiene/styrene resin. The following compositions were prepared by adding a methyl methacrylate/butadiene/styrene resin further to the composition having kaolin added to the composition of the above Example 48.

EXAMPLE 75

The methyl methacrylate/butadiene/styrene resin was added in an amount of 1 part by weight to 100 parts by weight of the composition having 3 parts by weight of kaolin added to 100 parts by weight of the composition of Example 48.

EXAMPLE 76

The methyl methacrylate/butadiene/styrene resin was added in an amount of 1 part by weight to 100 parts by weight of the composition having 5 parts by weight of kaolin added to 100 parts by weight of the composition of Example 48.

EXAMPLE 77

The methyl methacrylate/butadiene/styrene resin was added in an amount of 2 parts by weight to 100 parts by weight of the composition having 5 parts by weight of kaolin added to 100 parts by weight of the composition of Example 48.

EXAMPLE 78

The methyl methacrylate/butadiene/styrene resin was added in an amount of 25 parts by weight to 100 parts by weight of the composition having 10 parts by weight of kaolin added to 100 parts by weight of the composition of Example 48.

EXAMPLE 79

The methyl methacrylate/butadiene/styrene resin was added in an amount of 5 parts by weight to 100 parts by weight of the composition having 15 parts by weight of kaolin added to 100 parts by weight of the composition of Example 48.

EXAMPLE 80

The methyl methacrylate/butadiene/styrene resin was added in an amount of 20 parts by weight to 100 parts by weight of the composition having 25 parts by weight of kaolin added to 100 parts by weight of the composition of Example 1.

COMPARATIVE EXAMPLE 19

The methyl methacrylate/butadiene/styrene resin was added in an amount of 22 parts by weight to 100 parts by weight of the composition having 27 parts by weight of kaolin added to 100 parts by weight of the composition of Example 48.

Each of the above compositions was heated and kneaded by an injection molding machine and molded by an injection molding method into a card for IC card having a thickness of about 0.8 mm, and embossing was applied to the card for IC card by means of an embossing machine. Then, the card was colored by a chipper (coloring machine). The warpage of the card was measured in accordance with JIS X6301, and the results are shown in Table 17. In Table 17, warpage A and warpage B are as defined above.

TABLE 17

|  | Warpage A (mm) | Warpage B (mm) | Mold-ability | Cracking of embossed letters |
| --- | --- | --- | --- | --- |
| Example 75 | 2.4 | 2.2 | ◯ | ⊙ |
| Example 76 | 2.2 | 2.0 | ◯ | ⊙ |
| Example 77 | 2.2 | 2.0 | ◯ | ⊙ |
| Example 78 | 2.1 | 1.9 | ◯ | ⊙ |
| Example 79 | 1.9 | 1.7 | ◯–x | ◯ |
| Example 80 | 1.8 | 1.6 | ◯–x | ◯ |
| Comparative Example 19 | 1.8 | 1.6 | x | ◯–x |

It is evident from Table 17 that cards for IC cards injection molded from the compositions wherein kaolin was added in an amount of from 5 to 25 parts by weight and the methyl methacrylate/butadiene/styrene resin was further added in an amount of from 1 to 20 parts by weight, satisfy the requirement that the warpage of the cards after the embossing operation or after coloring by the chipper is within 2 mm as stipulated in JIS X6301, and they have no problem with respect to the moldability or cracking of embossed letters.

Then, in order to examine the influence of the average particle size (as measured by a light transmitting centrifugal sedimentation method by means of SA-CP3, manufactured by Shimadzu Corporation) of kaolin over the warpage, the following compositions were prepared by changing the average particle size of 4 μm of the kaolin in the above Example 26.

EXAMPLE 81

The average particle size of the kaolin in the composition of Example 73 was changed to about 0.5 μm.

EXAMPLE 82

The average particle size of the kaolin in the composition of Example 73 was changed to about 2 μm.

EXAMPLE 83

The average particle size of the kaolin in the composition of Example 73 was changed to about 8 μm.

EXAMPLE 84

The average particle size of the kaolin in the composition of Example 73 was changed to about 10 μm.

COMPARATIVE EXAMPLE 20

The average particle size of the kaolin in the composition of Example 73 was changed to about 12 μm.

Each of the above compositions was heated and kneaded by an injection molding machine and molded by an injection molding method into a card for IC card having a thickness of about 0.8 mm, and embossing was applied to the card for IC card by means of an embossing machine. Then, the card was colored by a chipper (coloring machine). The warpage of the card was measured in accordance with JIS X6301, and the results are shown in Table 18. In Table 18, warpage A is the amount of warpage (mm) after the embossing operation by means of a manual embossing machine, and warpage B is the amount of warpage (mm) after the embossing operation by means of a manual embossing machine, followed by coloring by the chipper.

TABLE 18

|  | Warpage A (mm) | Warpage B (mm) | Mold-ability | Cracking of embossed letters |
| --- | --- | --- | --- | --- |
| Example 73 | 2.0 | 1.8 | ◯ | ◯–x |
| Example 81 | 2.2 | 2.0 | ◯ | ◯ |
| Example 82 | 2.1 | 1.9 | ◯ | ◯ |
| Example 83 | 1.9 | 1.7 | ◯ | ◯–x |
| Example 84 | 1.8 | 1.6 | ◯–x | ◯–x |
| Comparative Example 20 | 1.7 | 1.5 | x | x |

It is evident from Table 18 that when the average particle size of kaolin is within a range of from about 0.5 to 10 μm, the warpage after the embossing operation or after coloring by the chipper satisfies the requirement of the amount of warpage being within 2 mm as stipulated in JIS X6301, and the moldability is also satisfactory. In Comparative Example 20, the average particle size of talc was about 12 μm, whereby the warpage was not problematic as being within 2 mm, but the moldability was poor.

Further, a method for reducing the warpage (curling) was studied, and as a result, aluminum type plate-like fine crystals (Mizukalac, tradename, manufactured by Mizusawa Kagaku Kogyo K.K.) were found to reduce the warpage (curling). On the basis of this discovery, the following compositions were prepared by adding aluminum type plate-like fine crystals to the composition of the above Example 48.

EXAMPLE 85

Aluminum type plate-like fine crystals were added in an amount of 3 parts by weight to 100 parts by weight of the composition of Example 48.

EXAMPLE 86

Aluminum type plate-like fine crystals were added in an amount of 5 parts by weight to 100 parts by weight of the composition of Example 48.

EXAMPLE 87

Aluminum type plate-like fine crystals were added in an amount of 15 parts by weight to 100 parts by weight of the composition of Example 48.

EXAMPLE 88

Aluminum type plate-like fine crystals were added in an amount of 25 parts by weight to 100 parts by weight of the composition of Example 48.

COMPARATIVE EXAMPLE 21

Aluminum type plate-like fine crystals were added in an amount of 27 parts by weight to 100 parts by weight of the composition of Example 48.

Each of the above compositions was heated and kneaded by an injection molding machine, and molded by an injection molding method into a card for IC card having a thickness of about 0.8 mm, and embossing was applied to the card for IC card by means of an embossing machine. Then, the card was colored by a chipper (coloring machine). The warpage of the card was measured in accordance with JIS X6301, and the results are shown in Table 19. In Table 19, warpage A is the amount of warpage (mm) after the embossing operation by means of a manual embossing machine, and warpage B represents the amount of warpage (mm) after the embossing treatment by means of a manual embossing machine, followed by coloring by the chipper.

TABLE 19

|  | Warpage A (mm) | Warpage B (mm) | Mold- ability | Cracking of embossed letters |
|---|---|---|---|---|
| Example 85 | 2.3 | 2.1 | ◯ | ◯ |
| Example 86 | 2.1 | 1.9 | ◯ | ◯ |
| Example 87 | 2.0 | 1.8 | ◯–x | ◯–x |
| Example 88 | 1.9 | 1.7 | ◯–x | ◯–x |
| Comparative Example 21 | 1.8 | 1.6 | x | x |

It is evident from Table 19 that when an aluminum type plate-like fine crystal component is added in an amount of from 5 to 25 parts by eight, the warpage after the embossing operation or after coloring by the chipper, satisfies the requirement of the amount of warpage being within 2 mm as stipulated in JIS X6301, and the moldability is also satisfactory. In Comparative Example 21, the aluminum type plate-like fine crystal component was added in an amount of 27 parts by weight, whereby the warpage was not problematic as being within 2 mm, but the moldability was poor.

However, when the aluminum type plate-like fine crystals component is added, cracking of embossed letters is likely to take place during the embossing operation. Also in such a case, it is possible to prevent cracking of embossed letters by adding a methyl methacrylate/butadiene/styrene resin. The following compositions were prepared by adding the methyl methacrylate/butadiene/styrene resin further to the composition having the aluminum type plate-like fine crystal component added to the composition of the above Example 48.

EXAMPLE 89

The methyl methacrylate/butadiene/styrene resin was added in an amount of 1 part by weight to 100 parts by weight of the composition having 3 parts by weight of the aluminum type plate-like fine crystal component added to 100 parts by weight of the composition of Example 48.

EXAMPLE 90

The methyl methacrylate/butadiene/styrene resin was added in an amount of 1 part by weight to 100 parts by weight of the composition having 5 parts by weight of the aluminum type plate-like fine crystal component added to 100 parts by weight of the composition of Example 48.

EXAMPLE 91

The methyl methacrylate/butadiene/styrene resin was added in an amount of 2 parts by weight to 100 parts by weight of the composition having 5 parts by weight of the aluminum type plate-like fine crystal component added to 100 parts by weight of the composition of Example 48.

EXAMPLE 92

The methyl methacrylate/butadiene/styrene resin was added in an amount of 25 parts by weight to 100 parts by weight of the composition having 10 parts by weight of the aluminum type plate-like fine crystal component added to 100 parts by weight of the composition of Example 48.

EXAMPLE 93

The methyl methacrylate/butadiene/styrene resin was added in an amount of 5 parts by weight to 100 parts by weight of the composition having 15 parts by weight of the aluminum type plate-like fine crystal component added to 100 parts by weight of the composition of Example 48.

EXAMPLE 94

The methyl methacrylate/butadiene/styrene resin was added in an amount of 20 parts by weight to 100 parts by weight of the composition having 25 parts by weight of the aluminum type plate-like fine crystal component added to 100 parts by weight of the composition of Example 48.

COMPARATIVE EXAMPLE 22

The methyl methacrylate/butadiene/styrene resin was added in an amount of 22 parts by weight to 100 parts by weight of the composition having 27 parts by weight of the aluminum type plate-like fine crystal component added to 100 parts by weight of the composition of Example 48.

Each of the above compositions was heated and kneaded by an injection molding machine and molded by an injection molding method into a card for IC card having a thickness of about 0.8 mm, and embossing was applied to the card for IC card by means of an embossing machine. Then, the card was colored by a chipper (coloring machine). The warpage of the card was measured in accordance with JIS X6301, and the results are shown in Table 20. In Table 20, warpage A and warpage B are as defined above.

TABLE 20

|  | Warpage A (mm) | Warpage B (mm) | Mold- ability | Cracking of embossed letters |
|---|---|---|---|---|
| Example 89 | 2.4 | 2.2 | ◯ | ⊚ |
| Example 90 | 2.2 | 2.0 | ◯ | ⊚ |
| Example 91 | 2.2 | 2.0 | ◯ | ⊚ |
| Example 92 | 2.1 | 1.9 | ◯ | ⊚ |
| Example 93 | 2.1 | 1.9 | ◯ | ◯ |
| Example 94 | 2.0 | 1.8 | ◯–x | ◯ |
| Comparative Example 22 | 1.9 | 1.7 | x | ◯–x |

It is evident from Table 20 that cards for IC cards injection molded from the compositions wherein aluminum type plate-like fine crystals were added in an amount of from 5 to 25 parts by weight and the methyl methacrylate/butadiene/styrene resin was further added in an amount of from 1 to 20 parts by weight, satisfy the requirement that the warpage of the card after the embossing operation or after coloring by the chipper is within 2 mm as stipulated in JIS X6301, and they have no problem with respect to the moldability or cracking of embossed letters.

As described in the foregoing, the plastic cards employing the plastic compositions of the present invention are excellent in the heat resistance and capable of preventing deformation or cracking of embossed letters at the time of the embossing operation, and they are also excellent in the moldability.

What is claimed is:

1. A plastic card molded by injection molding a plastic composition consisting essentially of an acrylonitrile/butadiene/styrene copolymer, wherein the content of butadiene is from 5–15 mol. %, the content of acrylonitrile is from 40–50 mol. % and the content of styrene is from 40–50 mol. %, each monomer unit present per 100 mol. % of copolymer, said composition having a melt flow index of from 5–25 g/10 min., as measured at 260° C. with a force of 2.16 kg in accordance with JIS K 7210, the plastic composition further containing at least one member selected from the group consisting of 0.5–25 parts by weight of talc, 5–25 parts by weight of kaolin and 5–25 parts by weight of aluminum plate-shaped fine crystals, per 100 parts by weight of the ABS copolymer.

2. The plastic composition according to claim 1, wherein the talc has an average particle size of from 4 to 30 μm as measured by a light transmitting centrifugal sedimentation method.

3. The plastic card according to claim 1, wherein the kaolin has an average particle size of from 0.5 to 10 μm.

4. A plastic card molded by injection molding a plastic composition, comprising: (I) an acrylonitrile/butadiene/styrene copolymer, wherein the content of butadiene is from 5–15 mol. %, the content of acrylonitrile is from 40–50 mol. % and the content of styrene is from 40–50 mol. %, each monomer unit present per 100 mol. % of copolymer, combined with at least one member selected from the group consisting of 0.5–25 parts by weight of talc, 5–25 parts by weight of kaolin and 5–25 parts by weight of aluminum plate-shaped fine crystals, per 100 parts by weight of the ABS copolymer and (II) from 0.5–25 parts by weight, per 100 parts by weight of the composition, of a methyl methacrylate/butadiene/styrene resin, said composition having a melt flow index of from 5–25 g/10 min (as measured at 260° C. with a force of 2.16 kg in accordance with JIS K 7210).

5. The plastic composition according to claim 4, wherein the talc has an average particle size of from 4–30 μm, as measured by a light transmitting centrifugal sedimentation method.

6. The plastic composition according to claim 4, wherein the kaolin has an average particle size ranging from 0.5–10 μm.

7. A plastic card molded by injection molding a plastic composition, comprising: (I) an acrylonitrile/butadiene/styrene copolymer, wherein the content of butadiene is from 5–15 mol. %, the content of acrylonitrile is from 40–50 mol. % and the content of styrene is from 40–50 mol. %, each monomer unit present per 100 mol. % of copolymer, combined with at least one member selected from the group consisting of 0.5–25 parts by weight of talc having an average particle size of 4–30 μm, 5–25 parts by weight of kaolin having an average particle size of 0.5–10 μm and 5–25 parts by weight of aluminum plate-shaped fine crystals, per 100 parts by weight of the ABS copolymer and (II) from 0.5–25 parts by weight, per 100 parts by weight of the composition, of a methyl methacrylate/butadiene/styrene resin, said composition having a melt flow index of from 5–25 g/10 min (as measured at 260° C. with a force of 2.16 kg in accordance with JIS K 7210).

* * * * *